(12) United States Patent
Zhang et al.

(10) Patent No.: US 8,349,123 B2
(45) Date of Patent: Jan. 8, 2013

(54) HIGH HEAT RESISTANT ADHESIVE AND SEALANT COMPOSITIONS

(75) Inventors: Yue S. Zhang, Parsippany, NJ (US); Louis A. Moore, High Bridge, NJ (US)

(73) Assignee: Henkel Corporation, Rocky Hill, CT (US)

( * ) Notice: Subject to any disclaimer, the term of this patent is extended or adjusted under 35 U.S.C. 154(b) by 1186 days.

(21) Appl. No.: 12/060,553

(22) Filed: Apr. 1, 2008

(65) Prior Publication Data

US 2009/0242123 A1  Oct. 1, 2009

(51) Int. Cl.
- C04B 37/00 (2006.01)
- C09J 4/00 (2006.01)
- C09J 101/00 (2006.01)
- C09J 201/00 (2006.01)
- C08F 283/04 (2006.01)

(52) U.S. Cl. .................. 156/325; 156/331.4; 525/454

(58) Field of Classification Search .......... 156/325, 156/331.4; 525/454

See application file for complete search history.

(56) References Cited

U.S. PATENT DOCUMENTS

| | | | | |
|---|---|---|---|---|
| 3,963,656 A | * | 6/1976 | Meisert et al. | 524/230 |
| 4,116,741 A | * | 9/1978 | Thoma et al. | 156/239 |
| 4,288,577 A | * | 9/1981 | McShane, Jr. | 525/453 |
| 4,931,157 A | * | 6/1990 | Valko et al. | 204/505 |
| 5,001,210 A | | 3/1991 | Coury et al. | |
| 5,407,517 A | * | 4/1995 | Hansel et al. | 156/331.7 |
| 2005/0215702 A1 | * | 9/2005 | Slark et al. | 524/589 |

FOREIGN PATENT DOCUMENTS

| | | |
|---|---|---|
| CA | 2198444 | 9/1997 |
| EP | 1378531 | 1/2004 |
| WO | 2005100430 | 10/2005 |

* cited by examiner

*Primary Examiner* — Michael Orlando
(74) *Attorney, Agent, or Firm* — James E. Piotrowski; Steven C. Bauman

(57) ABSTRACT

The invention provides adhesive and sealant compositions prepared from urethane prepolymers. The urethane prepolymers are obtained by reacting the novel urethane diols, polyester polyols and polyether polyols with an excess of diisocyanate. The urethane diols are prepared by reacting excess low molecular weight diols and diisocyanates. The invention is particularly useful in end use applications such as panel lamination.

14 Claims, 3 Drawing Sheets

HIGH HEAT RESISTANT ADHESIVE AND SEALANT COMPOSITIONS

FIELD OF THE INVENTION

The invention relates to urethane diols, urethane prepolymers and to creep resistant adhesives and sealants prepared using the urethane prepolymers of the invention. The invention provides the art with an adhesive-based solution to art recognized problems that occur when finished products, such as structural insulated panels (SIPs), are exposed to heat.

BACKGROUND OF THE INVENTION

Moisture curing urethane prepolymers have found their applications in adhesives, sealants, coatings and binders areas. Specifically, they can either be liquid prepolymers or hot melts. Curable hot melt adhesives and sealants are solid materials at room temperature and applied in molten form at high temperature. On cooling, the material solidifies and subsequently cures by a chemical crosslinking reaction to a form with good strength and toughness. Advantages of hot melt curable adhesives and sealants over non-curing hot melt systems include improved temperature and chemical resistance. An advantage of hot melt curable adhesives over traditional liquid curing systems is their ability to provide "green strength" upon cooling prior to cure.

The majority of reactive hot melts are moisture-curing urethane systems. They consist of isocyanate terminated urethane prepolymers that react with surface or ambient moisture in order to chain-extend and branch, forming a new polyurethane/urea polymer. Polyurethane prepolymers are conventionally obtained by reacting polyols with isocyanates. Cure is obtained through the diffusion of moisture from the atmosphere or the substrates into the prepolymer, and subsequent reaction. The reaction of moisture with residual isocyanate forms carbamic acid. This acid is unstable, decomposing into an amine and carbon dioxide. The amine reacts rapidly with isocyanate to form a urea. The final adhesive product is a crosslinked material polymerized primarily through urea groups and urethane groups. Hot melt adhesives and sealants, particularly those known as "reactive" or "moisture-curing" hot melt have characteristics which make them well suited for many applications which require high strength bonds that will withstand harsh environmental conditions.

Urethane prepolymer is used in many industrial applications where semistructural or even structural performance is required. Traditionally, hot melt offers better processing characteristics than one-part moisture curing liquid urethane system or two-part urethane. However, at lower crosslinking density, the heat resistance of cured hot melt is generally inferior to the other two types of urethane systems. It limits the application of hot melt urethane adhesives and sealants in key areas where heat resistance is important. There has been a constant drive to improve the high temperature mechanical property of hot melt to expand its application window.

There are several ways to improve the heat resistance of hot melt. These methods include the use of crystalline polyester polyols and thermoplastic materials, and modification of the cross-linking density of the hot melt.

Current technology formulates with crystalline polyester polyols that has high mechanical strength at room temperature. The resulting reactive hot melt has good mechanical performance after fully cured, but the heat stability is limited by the mechanical strength of the polyester. Upon heating, when the backbone of polyester reaches its transition temperature, the mechanical strength of the cured urethane system suffers.

When thermoplastic material is added, it can contribute to the heat resistance if its Tg is higher than the end use temperature and the molecular weight is higher than its entangled molecular weight. However, to achieve heat resistance of 80-100° C., a high molecular weight thermoplastic polymer with a glass transition temperature higher than 90° C. is needed. High molecular weight and high Tg may limit the polymer's compatibility with the rest of the system. It will cause processing difficulties in the manufacture and in the subsequent application of the adhesive.

The cross-linking density also contributes to the heat resistance. For example, moisture curing one-part liquid urethanes have high cross-linking density and good heat resistance. However, increasing the cross-linking density of hot melt systems requires higher isocyanate group concentration, which results in safety and health concerns and may cause excess bubbling that affect final bond properties. The stability of the adhesive in typical hot melt application equipment also suffers as the high NCO concentration of the prepolymer leads to fast viscosity increase at the application temperature. Therefore it is undesirable to improve the heat resistance of hot melt systems by increasing isocyanate group concentration.

There is a need in the art for high heat resistance moisture curing urethane prepolymer compositions that offer a good balance of open time, green strength, and favorable application properties. The current invention addresses this need.

SUMMARY OF THE INVENTION

One embodiment of the invention is directed to an isocyanate-terminated polyurethane prepolymer prepared by reacting a urethane diol, a polyol and an excess of polyisocyanate. The urethane diol used in the practice of the invention is a reaction product of a polyisocyanate with an excess amount of low molecular weight diol. Low molecular diols will have a molecular weight of less than 1000, more typically less than 500, even more typically less that about 250, and will be selected from the group consisting of aliphatic diols, aromatic diols, cyclic aliphatic diols and mixtures thereof.

Another embodiment of the invention is directed to a moisture reactive polyurethane hot melt adhesive or sealant composition. The adhesive or sealant composition of the invention comprises (i) a urethane diol prepared by reacting a polyisocyanate with an excess amount of low molecular weight diol, (ii) a polyol and (iii) a polyisocyanate. The adhesive or sealant composition may if desired further comprise one or more optional additives. Such additives include, for example, thermoplastic materials, tackifiers, fillers, or other desired ingredients. The additives may, independently, be added during the preparation of the prepolymer, or after the prepolymer has been prepared and prior to moisture cure.

Another embodiment of the invention is directed to a moisture reactive polyurethane hot melt adhesive or sealant composition which, when used to bond certain substrates together, reduces or eliminates surface defects that occur when the bonded substrates are exposed to heat. Following long durations of exposure to heat or sun light, the surface integrity of articles prepared using the adhesive of the invention are better maintained.

Another embodiment of the invention is directed to a method for bonding materials together. The method of the invention comprises applying the moisture reactive hot melt adhesive composition of the invention in a liquid form to a first substrate, bringing a second substrate in contact with the composition applied to the first substrate, and subjecting the applied composition to conditions which will allow the composition to cool and cure to an irreversible solid form, said conditions comprising moisture. Included are methods of bonding together substrates in the manufacture of various useful articles, in particular articles or end use applications that require high heat and creep resistance.

Still another embodiment of the invention is directed to an article of manufacture comprising the adhesive of the invention which has been cured.

Yet another embodiment of the invention is directed to a method of reducing or eliminating surface defects that occur in manufactured products exposed to heat, in particular heat obtained by exposure of the manufactured item to thermal/solar energy. Included are items that are intended for outdoor use and are typically at least occasionally stored outdoors under conditions where prolonged exposure to the sun is unavoidable. Products include components used in the building and automobile/recreational vehicle industries.

BRIEF DESCRIPTION OF THE DRAWING FIGURES

DETAILED DESCRIPTION OF THE INVENTION

Figure 1:
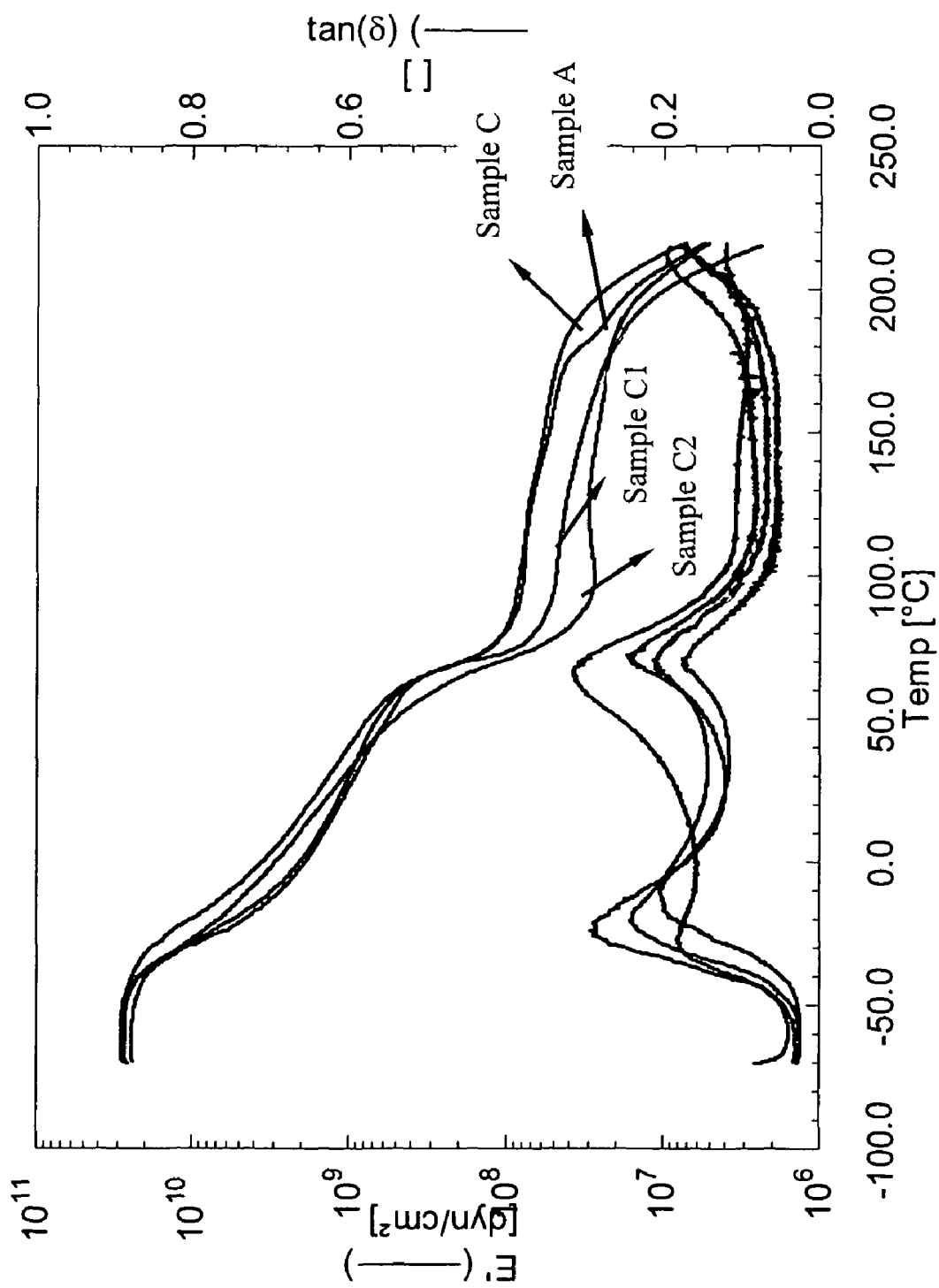
FIG. 1 shows dynamic mechanical properties of various cured hot melt urethane adhesives.

The term moisture curing urethane prepolymer, moisture curing reactive hot melt, moisture curable/curing hot melt adhesive and moisture curing urethane/polyurethane adhesives are used interchangeable herein. Moisture curing hot melt adhesives consist primarily of isocyanate-capped polyurethane prepolymers obtained by reacting diols (typically polyethers, polyesters and polybutadienes) with a polyisocyanate (most commonly methylene bisphenyl diisocyanate (MDI)). A stoichiometric imbalance of NCO to OH groups is required in order for moisture cure to proceed, cure being obtained through the diffusion of moisture from the atmosphere or the substrates into the adhesive and subsequent reaction of moisture with residual isocyanate.

The invention is directed to an isocyanate-terminated polyurethane prepolymer prepared by reacting a urethane diol, a polyol and an excess of polyisocyanate. The moisture curing urethane prepolymers are prepared with high softening point urethane diols. Urethane diols produced by reacting excess low molecular weight diols with isocyanate is used as a key component for moisture curing urethane prepolymer. The urethane diol used in the practice of the invention is a reaction product of a polyisocyanate with an excess amount of low molecular weight diol. Low molecular diols are chosen from organic diols having molecular weight less than less than 1000, more typically less than 500, even more typically less that about 250, and will be selected from the group consisting of aliphatic diols, aromatic diols, cyclic aliphatic diols and mixtures thereof. The resulted urethane diols bear hydroxyl functional groups and therefore can react further with organic isocyanate to form isocyanate terminated prepolymer. The urethane diols may be used along in the reaction or as mixtures.

The urethane prepolymers of the invention have good physical properties during application and superior high temperature creep resistance after curing. The adhesives of the invention are used in the manufacturing of structural insulating panels, window and door assembly, panel laminations, bookbinding, lamp bonding and textile bonding. The adhesives are particularly well suited for use in the manufacture of recreational vehicle (RV) side wall panels. It has been discovered that use of the adhesive of the invention provides the art with an adhesive-based solution to art recognized problems that occur when certain finished products are exposed to heat in particular thermal/solar energy that hits the article during its intended use. Included are items that are intended for outdoor use and are typically at least occasionally stored outdoors under conditions where prolonged exposure to the sun is unavoidable. Products include components used in the building and automobile/recreational vehicle industries such as panels prepared by bonding fiber reinforced plastic (FRP) to 3 ply hard wood of about one-eight inch in thickness (Luaun). Continuous and/or repeated cycles of exposure to radiant energy may result in poor surface appearance. The purchaser of the goods then requires the article to be fixed or replaced. It has been discovered that use of the adhesive of the invention in manufacturing such goods substantially reduced the occurrences of surface distortions.

Urethane diol is an essential component in regulating the hard domains of urethane structure. Urethane diols are prepared by reacting excess low molecular weight diol with an organic isocyanate. The product, which can be used as a starting material for urethane prepolymer, has a significantly higher softening point than the low molecular weight diol it was based on. The effective amount of urethane diol is between 0.05 and 70%, and preferably between 1 and 40%, and most preferably between 2 to 30%.

Two-step reaction can also be used to produce the urethane prepolymer with regulated hard segments. In the first step, excess low molecular weight diols are reacted with a small amount of isocyanates to yield hydroxyl terminated high softening point urethane diols. In the next step, additional diols were added to the system followed by excess amount of isocyanate. The resulting urethane prepolymers are molten at high temperature with good viscosity and stability. They cure upon contact with moisture in the air or from the substrate to form a tough and strong material.

To obtain the urethane diols of the invention, any non-polymeric aliphatic, aromatic, and or cyclic aliphatic compound having a molecular weight lower than 1000, preferably lower than 500 and containing active hydrogen atoms may be utilized. Non-polymeric difunctionals that may be used to practice the invention include non-polymeric diols, diamines, and diacids. Aliphatic difunctionals that may be used to practice the invention include dodecanediol, decanediol, octanediol and hexanediol, butanediol, petanediol, nonanediol, and the mixture thereof.

Liquid crystalline diols such as the main chain mesogen Brilliant Yellow and the side chain diol mesogen Dispersed Red may be used. Crystalline aromatic difunctionals that may be utilized to practice the invention include 1,5-dihydroxynaphthalene (DHN); 2',4'-dihydroxybenzophenone (DHBP) and 4,4'-(hexanfluroisopropylidene)diphenyl (HFIPDP). Additional crystalline diols that may be utilized include but not limit to aminobenzyl alcohol; aminobenzylamine; aminophenol, Bis(2-hydroxyethyl)terephthalate; 1,5-Diaminonaphthalene, 4-hydroxyphenethyl alcohol; 2-hydroxy-4-methoxybenzyl alcohol; hydroxybenzyl alcohol, 2-(2-Hydroxyethoxy)phenol, 3-(1-hydroxyethyl) aniline, 4-hydroxy-3-methoxybenzyl alcohol, homovanillyl alcohol, 4-hydroxyphenethyl alcohol, HQEE, Diethylstilbestrol; 9H-Fluorene-9,9-dimethanol; Eosin B, spirit soluble;

5-tertbutyl-1,3-benzenedicarboxilic acid; 5-tert-Butyl-4-hydroxy-2-methylphenyl sulfide; 3-(4-Carboxylphenyl)2,3-dihydro-1,1,3-trimethyl indene-5-carboxylic acid; 4,4'-di(aminophenyl)-9-fluorenylidene; 2',4'-Dihydroxyacetophenone and the mixture thereof.

Cyclic aliphatic difunctionals that may be utilized in the present invention include 1,4:3,6-dianhydro-D-glucitol; hydrogenated bisphenol A, 1,4-cyclohexanedimethanol; 1,4-cyclohexane diol; cyclododecane diol and mixtures thereof.

In addition to the urethane diol, the adhesive requires an isocyanate component. Any suitable compo d which contains two or more isocyanate groups may be used for preparing urethane prepolymers. Non-limiting examples of useful isocyanate components include methyenebisphenyldiisocyanate (MDI), isophoronediisocyanate (IPDI), hydrogenated methylenebisphenyldiisocyanate (HMDI) and toluene diisocyanate (TDI). The isocyanate component is typically used in amounts of from about 5 to about 40 wt %.

The adhesive will also contain a polyol. Non-limiting examples include polyether polyols and polybutadienes. The added polyol will typically be used in amounts from about 0.01 to about 90 wt %.

Other optional components may be added such as thermoplastic resins and/or (meth)acrylic polymers. Such polymers may be blended with the polyol prior to reaction thereof with the isocyanate, or may be added to the isocyanate terminated prepolymer.

Organic polyisocyanates, which may be used to practice the invention, include alkylene diisocyanates, cycloalkylene diisocyanates, aromatic diisocyanates and aliphatic-aromatic diisocyanates. Specific examples of suitable isocyanate-containing compounds include, but are not limited to, ethylene diisocyanate, ethylidene diisocyanate, propylene diisocyanate, butylene diisocyanate, trimethylene diisocyanate, hexamethylene diisocyanate, toluene diisocyanate, cyclopentylene-1,3-diisocyanate, cyclo-hexylene-1,4-diisocyanate, cyclohexylene-1,2-diisocyanate, 4,4'-diphenylmethane diisocyanate, 2,2-diphenylpropane-4,4'-diisocyanate, xylylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 2,4-tolylene diisocyanate, dichlorohexa-methylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene, 4,4'-dimethyldiphenyl-methane-2,2',5,5-tetratetraisocyanate, and the like. While such compounds are commercially available, methods for synthesizing such compounds are well known in the art. Preferred isocyanate-containing compounds are methyenebisphenyldiisocyanate (MDI), isophoronediisocyante (IPDI), hydrogenated MDI (HMDI) and toluene diisocyanate (TDI).

The prepolymer is most commonly prepared by the polymerization of a polyisocyanate with a polyol, most preferably the polymerization of a diisocyanate with a low molecular weight diol. Polyols useful in the practice of the invention include polyhydroxy ethers (substituted or unsubstituted polyalkylene ether glycols or polyhydroxy polyalkylene ethers), the ethylene or propylene oxide adducts of polyols and the monosubstituted esters of glycerol, polyamide polyols, amorphous and liquid polyesters, castor oil and vegetable oils of different molecular weight and functionality, other fatty polyols, polybutadiene diol, polyisobutylene diol as well as mixtures thereof.

Examples of polyether polyols include a linear and/or branched polyether having hydroxyl groups, and contain substantially no functional group other than the hydroxyl groups. Examples of the polyether polyol may include polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct at least one compound selected from the group consisting of ethylene glycol, propylene glycol, diethylene glycol, dipropylene glycol, triethylene glycol, 2-ethylhexanediol-1,3,glycerin, 1,2,6-hexane triol, trimethylol propane, trimethylol ethane, tris(hydroxyphenyl)propane, triethanolamine, triisopropanolamine, ethylenediamine and ethanolamine; with at least one compound selected from the group consisting of ethylene oxide, propylene oxide and butylene oxide.

A number of suitable polyols are commercially available. Non-limiting examples include polyethers such as ARCOL PPG 2025 (Bayer), PolyG 20-56 (Arch) and PolyG 30-42 (Arch), polyamide polyols such as PAPOL polyol (Arizona Chemical), amorphous or liquid polyesters such as Dynacoll 7230 (Degussa) and Stepanpol PD-56 (Stepan), and polybutadiene such as PolyBD R-45HTLO (Sartomer). "Polymer polyols" are also suitable, i.e., graft polyols containing a proportion of a vinyl monomer, polymerized in situ, e.g., Niax 34-28 (Dow Chemical). Additional polyols include polycaprolactone diols and polycarbonate diols.

Examples of fatty polyols may include castor oil, the products of hydroxylation of unsaturated or polyunsaturated natural oils, and the products of hydrogenations of unsaturated or polyunsaturated polyhydroxyl natural oils, polyhydroxyl esters of alkyl hydroxyl fatty acids, polymerized natural oils, soybean polyol, and alkylhydroxylated amides of fatty acids.

The urethane prepolymer may optionally contain a thermoplastic polymer. The thermoplastic polymer may be either a functional or a non-functional thermoplastic. Example of suitable thermoplastic polymers include acrylic polymers, functional acrylic polymers, non-functional acrylic polymers, acrylic block copolymer, acrylic polymer having tertiary-alkyl amide functionality, polysiloxane polymers, polystyrene copolymers, polyvinyl polymers, divinylbenzene copolymers, polyetheramides, polyvinyl acetal, polyvinyl butyral, polyvinyl acetate, polyvinyl chloride, methylene polyvinyl ether, cellulose acetate, styrene acrylonitrile, amorphous polyolefin, olefin block copolymer [OBC], polyolefin plastomer, thermoplastic urethane, polyacrylonitrile, ethylene vinyl acetate copolymer, ethylene vinyl acetate terpolymers, functional ethylene vinyl acetate, ethylene acrylate copolymer, ethylene acrylate terpolymer, ethylene butadiene copolymers and/or block copolymers, styrene butadiene block copolymer, and mixtures thereof.

A number of suitable thermoplastic polymers are commercially available. Non-limiting examples include ethylene vinyl acetate copolymers such as the Elvax® EVA resins (Dupont), ethylene acrylate copolymers such as the Enable™ resins (ExxonMobil), and (meth)acrylic polymers such as the Elvacite® resins (Lucite) and Degalan resins (Degussa).

The urethane prepolymers may also be prepared by the reaction of a polyisocyanate with a polyamino or a polymercapto-containing compound such as diamino polypropylene glycol or diamino polyethylene glycol or polythioethers such as the condensation products of thiodiglycol either alone or in combination with other glycols such as ethylene glycol, 1,2-propylene glycol or with other polyhydroxy compounds disclosed above.

Further, small amounts of low molecular weight dihydroxy, diamino, or amino hydroxy compounds may be used as chain extenders.

While the urethane prepolymer may be used directly as described above, if desired the systems of the present invention may also be formulated with other conventional additives which are compatible with the composition. Such additives include defoamers, plasticizers, compatible tackifiers, curing catalysts, dissociation catalysts, fillers, rheology modifiers, anti-oxidants, pigments, adhesion promoters, stabilizers, aliphatic $C_5$-$C_{10}$ terpene oligomers, bituminous materials and the like. Thixotropic agents, such as fumed silica, may also be added to provide sag resistance. Conventional additives that are compatible with a composition according to this invention may simply be determined by combining a potential additive with the composition and determining if they are compatible. An additive is compatible if it is homogenous within the product. Non-limiting examples of suitable additives include, without limitation, rosin, rosin derivatives, rosin ester, aliphatic hydrocarbons, aromatic hydrocarbons, aromatically modified aliphatic hydrocarbons, terpenes, terpene phenol, modified terpene, high molecular weight hindered phenols and multifunctional phenols such as sulfur and phosphorous-containing phenol, terpene oligomers, DMDEE, silanes, paraffin waxes, microcrystalline waxes and hydrogenated castor oil. The reactive hot melt adhesives of the invention may also contain flame retardant components.

The invention also provides a method for bonding articles together which comprises applying the reactive hot melt composition of the invention in a liquid melt form to a first article, bringing a second article in contact with the composition applied to the first article, and subjecting the applied composition to conditions which will allow the composition to cool and cure to a composition having an irreversible solid form, said conditions comprising moisture. The composition is typically distributed and stored in its solid form, and is stored in the absence of moisture. When the composition is ready for use, the solid is heated and melted prior to application. Thus, this invention includes reactive polyurethane hot melt adhesive compositions in both its solid form, as it is typically to be stored and distributed, and its liquid form, after it has been melted, just prior to its application.

After application, to adhere articles together, the reactive hot melt is subjected to conditions that will allow it to solidify and cure to a material that has an irreversible solid form. Solidification (setting) occurs when the liquid melt begins to cool from its application temperature to room temperature. Curing, i.e., chain extending, to a material that has an irreversible solid form, takes place in the presence of ambient moisture.

The reactive hot melt compositions of the invention are useful in the manufacture of articles made of a wide variety of substrates (materials), including but not limited to wood, metal, polymeric plastics, glass and textiles. The adhesives find use in manufacture of consumer products and in specialized industrial applications. Markets where the adhesives find use include: textiles (e.g., carpet and clothing), food packaging, footwear, consumer, construction, furniture, automotive and aircraft. Applications include but are not limited to use in water towers, for bonding to exterior surfaces, bonding to wood with high levels of pitch and e.g., in marine and automotive applications, use as a glazing/backbedding compound in the manufacture of windows, use in the manufacture of doors including entry doors, garage doors and the like, use in the manufacture of architectural panels, use in bonding components on the exterior of vehicles, and the like.

The invention is further illustrated by the following non-limiting examples.

EXAMPLES

The following tests were used to determine viscosity, viscosity stability, initial strength, and open time.

Viscosity:

Viscosity was measured using a Brookfield Viscometer with Thermosel heating unit, spindle 27. The adhesive was heated in an oven to 120° C. 10.5 grams of adhesive was weighed into a stainless steel viscometer tube. The tube was inserted into the Viscometer and left to equilibrate to a constant viscosity reading at 120° C. A second reading was taken after the sample was conditioned for another 60 mins. The viscosity stability was calculated as the hourly rise in viscosity.

Initial (Green) Strength:

A 0.152 mm thick film of adhesive was applied to a glass plate, preheated at 120° C. A strip of vinyl (16 mm wide, 0.18 mm thick) with a hole punched near one end was applied over the adhesive. The plate was inverted and, at several temperature intervals, a 103 grams weight was applied to the hole in the vinyl for 10-60 seconds. The peel rate at these intervals was calculated. This method is also known as dynamic peel.

Open Time:

The adhesive was preheated to 120° C. and a 0.152 mm thick film was applied to Kraft paper. A paper strip was applied onto the adhesive at a 1 minute interval and pressed down using a 2 kg roller across the surface. The paper strip is peeled away after 20 mins bonding. The open time limit occurs when there is about 50% fiber tear.

Example 1

The following example illustrates the preparation of urethane diols.

100 grams (1.39 mol) of cyclohexanedimethanol was preheated to 80° C. in a reactor to which 69.4 g (0.56 mol) of MDI was added in three shots with stirring. The mixture was stirred further under vacuum and a significant exotherm was observed. The reaction temperature was controlled to be around 120° C. After 1 hr, the mixture became a very viscous melt and allowed to cool to room temperature. The product solidified into a hard, off white solid.

Example 2

The following example illustrates the preparation of urethane diols with reactive diluents.

100 grams (1.39 mol) of cyclohexanedimethanol and 60 grams of polypropylene glycol PPG 2000 (0.06 mol) were mixed and preheated to 80° C. in a reactor to which 72.4 g (0.58 mol) of MDI was added in three shots with stirring. The mixture was stirred further under vacuum and a significant exotherm was observed. The reaction temperature was controlled to be around 120° C. After 1 hr, the mixture became a viscous melt and was allowed to cool to room temperature. The product solidified into an off white solid.

Example 3

The following examples teach the preparation of reactive hot melt adhesives.

Ingredients including urethane diols and optional polyether polyols, polyester polyols, acrylics copolymers and tackifiers were mixed together at 80-100° C. in a flange flask equipped with a stirrer and thermocouple. After allowing time for adequate mixing, vacuum was applied to the flask, typically for a period of 2 hrs during which the temperature was raised to 110-120° C. The vacuum was removed and the polyisocyanate was added. After thorough mixing, the vacuum was reapplied and the reaction was allowed to continue for 2 hrs. The material was removed, cooled and stored.

The following structure shows an example of a dominant structure of the synthesized urethane diols, where R and R' are an aliphatic, aromatic or cyclic aliphatic structure.

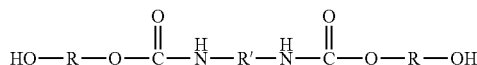

Example 4

Table 1 lists some reactive hot melt formulae with improved hard segments using urethane diol intermediate, polyester and acrylic thermoplastics. Samples A-E, which used urethane diols as active ingredients in accordance with the practice of the invention, was compared to Comparative Sample 1 (C1) which was not prepared with urethane diols.

TABLE 1

|  | Sample A | Sample B | Sample C | Sample D | Sample E | Comparative Sample C1 |
|---|---|---|---|---|---|---|
| Resiflow | 0.15 | 0.15 | 0.15 | 0.15 | 0.15 | 0.15 |
| PPG 2000 | 120.00 | 120.00 | 120.00 | 120.00 | 120.00 | 120.00 |
| Dynacoll 7360 | 60.00 | 60.00 | 60.00 | 60.00 | 60.00 | 60.00 |
| Dynacoll 7250 | 30.00 | 30.00 | 30.00 | 30.00 | 30.00 | 30.00 |
| Cyclohexane dimethanol (CHDM) |  |  | 12.00 |  |  | 12.00 |
| CHDM-MDI-CHDM |  |  |  | 30.00 |  |  |
| 1,12-dodecanediol (DDD) | 12.00 |  |  |  |  |  |
| DDD-MDI-DDD |  |  |  |  | 24.00 |  |
| 1,9-Nonanediol |  | 10.00 |  |  |  |  |
| MDI (1) | 18.00 | 18.00 | 18.00 |  |  |  |
| MDI (2) | 43.96 | 41.65 | 52.72 | 58.36 | 50.52 | 70.72 |
| Elvacite 2016 | 50.00 | 50.00 | 50.00 | 50.00 | 50.00 | 50.00 |
| NCO | 2.07 | 1.80 | 2.75 | 1.77 | 1.88 | 2.68 |
| Viscosity @ 250° F., 30 min. | 56,500 | 27,560 | 27,120 | 31,560 | 29,900 | 11,770 |
| Stability | 7.96% | 11.30% | 5.00% | 16.70% | 6.00% | 12.00% |
| Dynamic peel. | 12/36.5 | 12/36.5 | 16/30.2 | 14/39.4 | 15/27.6 | 5/30.1 |
| Open time | 16 min | 19 min | >20 min | 12 min | 14 min | 16 min |

The data shows that the products of the invention demonstrate a good balance of open time and green strength.

FIG. 1 compares the mechanical strength of Samples A and C with Comparative Sample C1 and a second conventional reactive hot melt sample that does not contain urethane diols (Comparative Sample 2 (Sample C2)). The Figure shows that the plateau moduli of the Samples A and C hot melts were significantly higher than the conventional products (Samples C1 and C2).

Example 5

Figure 2:
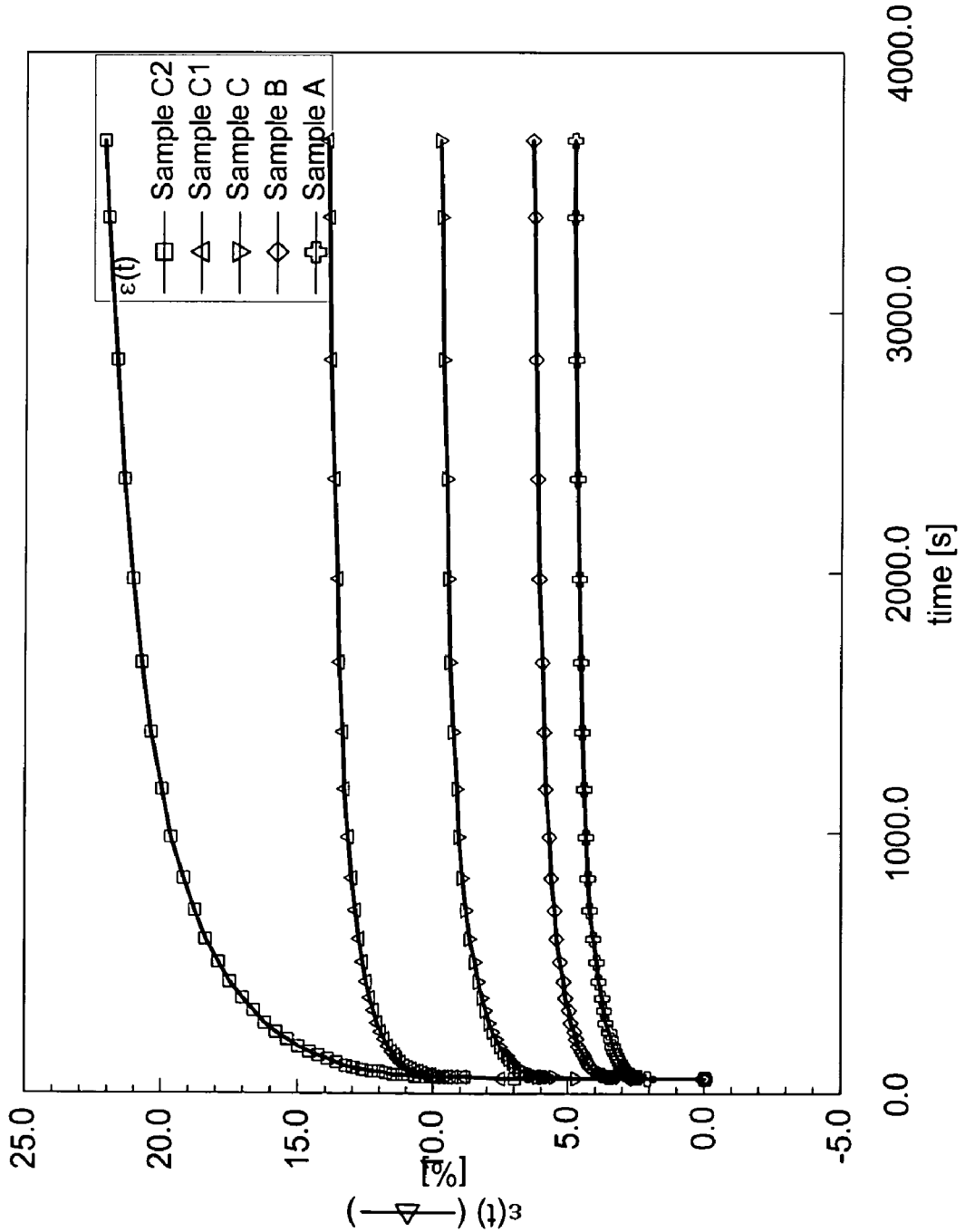
FIG. 2 shows the creep performance of various hot melt urethane adhesives at 80° C.

Creep test was also used to compare the heat resistance of RHM under load. A rheological test was conducted by subjecting the cured material to a static load of 0.28 MPa at a give temperature. FIG. 2 compares the creep performance of Samples A, B and C and Comparative Samples C1 and C2 at 80° C. It is clear that the adhesives of the invention creep significantly less than the conventional comparative hot melt samples, which creep at least 10% within the first 10 mins of applying load.

Example 6

Figure 3:
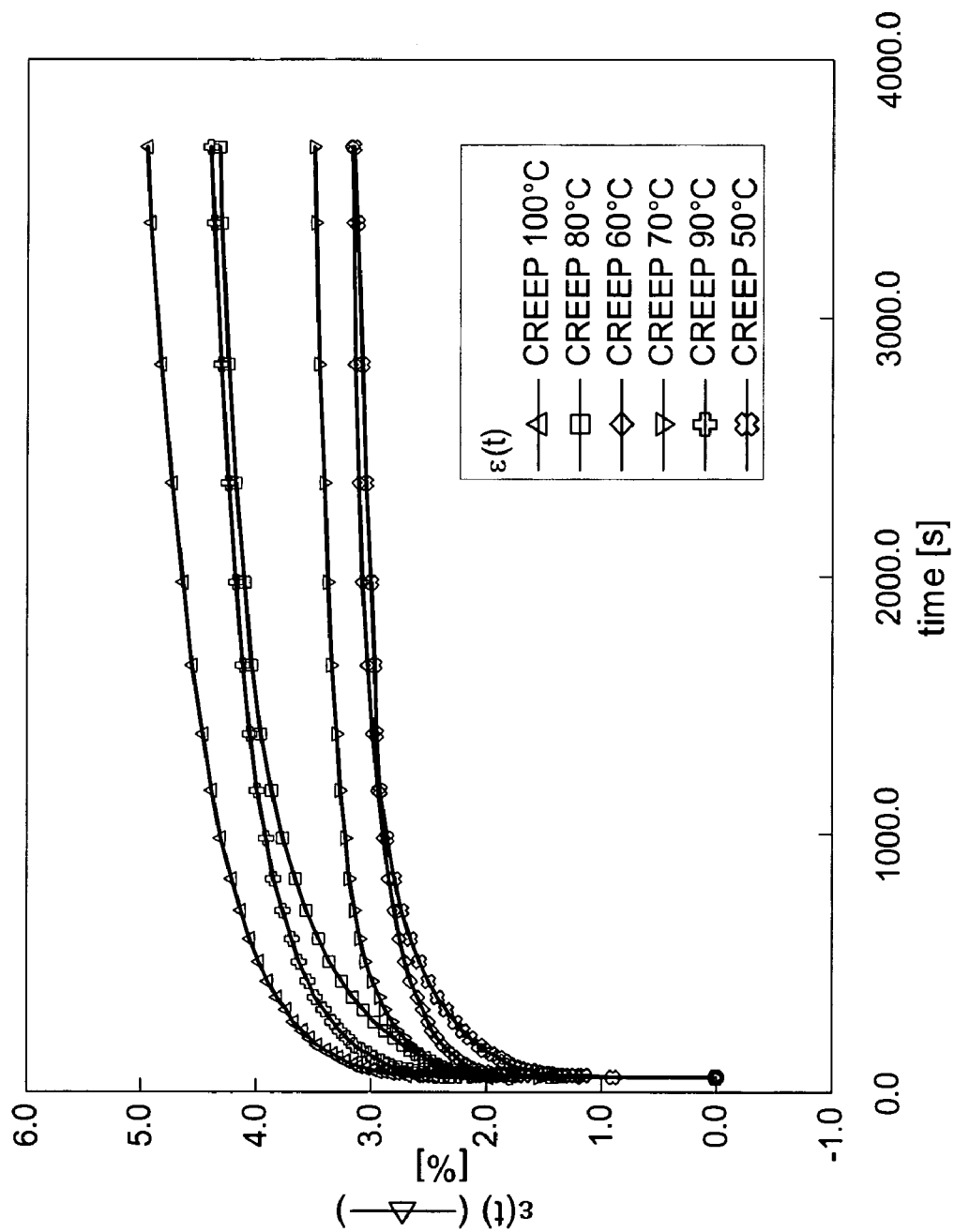
FIG. 3 shows the temperature dependence of the creep resistance of an adhesive of the invention.

The creep of Sample A was tested over a wide temperature range. Results are shown in FIG. 3, which shows that Sample A has great creep resistance over a wide temperature window. As FIG. 3 shows, Sample A creeps less than 2% at 50° C. and less than 5% at 100° C.

Example 7

A key application of the high heat resistant reactive hot melt of the invention is RV sidewall lamination. Distortion describes a unique type of surface defect on RV sidewall when the unit is at service. It appears as FRP bumps with a diameter of 2 in or larger, rose above the surface. When pressed, it feels hollow underneath. It normally appears after long time exposure to high temperature or sun light. It was discovered that the surface temperature of FRP could reach 200° F. under direct sun light. The used of dark graphics will further increase surface temperature to be 200° F. plus.

A distortion test was set up to mimic field condition to test performance of the adhesive of the invention. Large panels were assembled using the reactive hot melt of the invention. Halogen light was used as the heat source. The surface temperature was controlled to be 200° F. for 8 hrs every day and allowed to cool to room temperature to stimulate conditions that a panel would experience in use. A total of 5 testing circles are used to give 40 hrs heat exposures. At the end of the heat exposure, the panel was evaluated for surface appearance. Where the reactive hot melt without urethane diol modification showed significant distortion, the sample using urethane diol showed no sign of distressed surface.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. An isocyanate-terminated polyurethane prepolymer prepared by reacting a mixture comprising a urethane diol, a polyether polyol and an excess of polyisocyanate, wherein the urethane diol is a reaction product of an aromatic polyisocyanate with an excess amount of low molecular weight diol.

2. The prepolymer of claim 1 wherein the low molecular weight diol has a molecular weight of less than 1000.

3. The prepolymer of claim 2 wherein the low molecular weight diol is selected from the group consisting of aliphatic diols, aromatic diols, cyclic aliphatic diols and mixtures thereof.

4. The prepolymer of claim 1 wherein the mixture further comprises a polyol selected from an additional polyether polyol, amorphous polyester polyol, polyester polyol, polybutadiene diol, polyisobutylene diol, polyamide, castor oil, and mixtures thereof.

5. A moisture reactive polyurethane hot melt adhesive or sealant composition comprising the urethane prepolymer of claim 1.

6. The composition of claim 5 further comprising at least one additive selected from the group consisting of thermoplastic materials, tackifiers, fillers, defoamers, plasticizers, UV stabilizers, antioxidants, waxes, adhesion promoters, thixotropic agents, curing catalysts, or mixture thereof.

7. An article of manufacture comprising the adhesive of claim 5 which has been cured.

8. A method of reducing or eliminating surface defects that occur in manufactured products exposed to heat, said method comprising applying the moisture reactive hot melt adhesive composition of claim 5 in a liquid form to a first substrate, bringing a second substrate in contact with the composition applied to the first substrate, subjecting the applied composition to moisture and allowing the composition to cool and cure to an irreversible solid form.

9. The prepolymer of claim 1 wherein the urethane diol comprises a diphenyl methane moiety in the backbone.

10. The prepolymer of claim 1 wherein the urethane diol is a reaction product of at least one of toluene diisocyanate, 2,2-diphenylpropane-4,4'-diisocyanate, methylene bisphenyldiisocyanate, xylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 2,4-tolylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene or 4,4'-dimethyldiphenyl-methane-2,2',5,5-tetratetraisocyanate with an excess amount of low molecular weight diol.

11. The prepolymer of claim 1 wherein the urethane diol is a reaction product of at least one of toluene diisocyanate and methylene bisphenyldiisocyanate with an excess amount of low molecular weight diol.

12. The prepolymer of claim 1 wherein the urethane diol is a reaction product of methylene bisphenyldiisocyanate with an excess amount of low molecular weight diol.

13. The prepolymer of claim 1 wherein the mixture further comprises an amorphous polyester polyol.

14. The prepolymer of claim 1 wherein the mixture further comprises a thermoplastic resin, a (meth)acrylic polymer or a combination thereof.

* * * * *